(12) United States Patent
Poncelet et al.

(10) Patent No.: US 9,696,460 B2
(45) Date of Patent: Jul. 4, 2017

(54) ANTI-UV NANOPARTICLES

(75) Inventors: Olivier Poncelet, Grenoble (FR); Olivier Renard, Fontanil-Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 189 days.

(21) Appl. No.: 13/521,642

(22) PCT Filed: Jan. 11, 2011

(86) PCT No.: PCT/IB2011/050114
§ 371 (c)(1),
(2), (4) Date: Nov. 27, 2012

(87) PCT Pub. No.: WO2011/083447
PCT Pub. Date: Jul. 14, 2011

(65) Prior Publication Data
US 2013/0115838 A1 May 9, 2013

(30) Foreign Application Priority Data

Jan. 11, 2010 (FR) ...................... 10 50133

(51) Int. Cl.
*G02B 1/04* (2006.01)
*B01J 13/08* (2006.01)
*D06M 23/08* (2006.01)
*D06M 23/12* (2006.01)

(52) U.S. Cl.
CPC ................ *G02B 1/04* (2013.01); *B01J 13/08* (2013.01); *D06M 23/08* (2013.01); *D06M 23/12* (2013.01); *D06M 2200/25* (2013.01); *Y10T 442/2607* (2015.04)

(58) Field of Classification Search
None
See application file for complete search history.

(56) References Cited

U.S. PATENT DOCUMENTS

| 4,369,213 | A | * | 1/1983 | Adelman et al. | 427/389.9 |
| 4,554,240 | A | * | 11/1985 | Schulz | G03F 7/0388 430/285.1 |
| 5,272,127 | A | * | 12/1993 | Mandoh | B01J 13/16 503/200 |
| 5,574,166 | A | * | 11/1996 | Winter | B41M 5/46 548/260 |
| 6,368,577 | B1 | | 4/2002 | Kropf et al. | 424/59 |
| 7,053,034 | B2 | | 5/2006 | Shefer et al. | 510/349 |
| 2001/0022965 | A1 | * | 9/2001 | Heger | A61K 8/042 424/59 |
| 2009/0155371 | A1 | | 6/2009 | Sojka et al. | 424/497 |

FOREIGN PATENT DOCUMENTS

| WO | WO 00/35415 | 6/2000 |
| WO | WO 2008/061885 | 5/2008 |

* cited by examiner

*Primary Examiner* — Alexandre Ferre
(74) *Attorney, Agent, or Firm* — Norton Rose Fulbright US LLP

(57) ABSTRACT

The invention relates to nanoparticles having a core that is fully or partially formed by at least one UV-absorbing organic compound in crystallized form and coated with an outer layer formed by at least one hydrophilic polymer, said UV-absorbing organic compound(s) and hydrophilic polymer(s) being associated in a weight ratio of organic compound(s) to hydrophilic polymer(s) varying between 0.2 and 0.4.

15 Claims, 2 Drawing Sheets

Pyrene-1-carboxylic acid nanodispersed in water

ANTI-UV NANOPARTICLES

Figure 1:
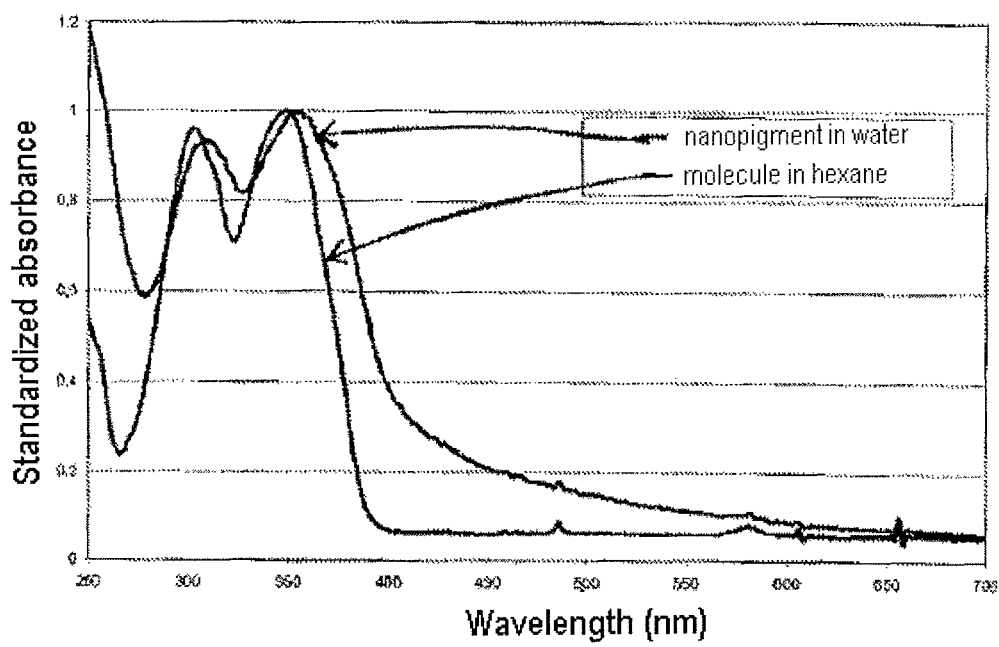

This application is a national phase application under 35 U.S.C. §371 of International Application No. PCT/IB2011/050114 filed 11 Jan. 2011, which claims priority to French Application No. 1050133 filed 11 Jan. 2010. The entire contents of each of the above-referenced disclosures is specifically incorporated herein by reference without disclaimer.

The present invention is targeted at providing nanoparticles having the role of combating UV radiation, which particles are dispersible in water, have a prolonged stability over time and are stable under UV radiation.

UV absorbers are widely employed in diverse applications where it is desired to take advantage of their property of UV absorbance. They make it possible to protect the materials with which they are combined from UV-visible radiation.

These UV absorbers can be inorganic in nature, such as metal oxides, for example $TiO_2$, ZnO or $CeO_2$, or organic in nature, such as substituted benzophenones, for example hydroxybenzophenones, and substituted benzotriazoles.

The latter organic UV absorbers exhibit good properties of UV absorbance and of stability. In addition, they have the advantage of being able to be regenerated, employing mechanisms for the dissipation of the absorbed energy by reversible conformational change.

However, the majority of organic chemical compounds of this type have a strongly hydrophobic nature which makes it difficult, indeed even impossible, to employ them in aqueous formulations. Their lack of solubility in an aqueous medium makes it necessary to employ them either in an organic solvent medium or in a modified form in order to confer on them the required solubility in an aqueous medium.

As regards the first alternative, it is today necessary, out of concern to protect the environment and to restrict gas or liquid discharges, to favor the use of water over that of organic solvents.

As regards the second alternative, which is targeted at adapting the affinity of a chemical compound for a solvent by grafting a suitable organic group, such as, for example, ammonium, carboxylate or sulfonate, it can unfortunately furthermore harm the UV absorbance properties of the compound thus modified.

Thus, in the case of organic UV absorbers which may or may not be able to be regenerated, which exhibit a high aromaticity, the grafting of substituents can result in the absorption spectra being shifted towards the visible region. This presents a problem in the fields of application where the visible region must not be affected.

This is because the use of materials additionally having high coefficients of absorption at wavelengths of less than 400 nm specifically has the advantage of rendering them completely transparent in the visible region and thus of not at the same time affecting the coloring effect of the coloring material capable of being combined with them.

Furthermore, due to the strong hydrophobic nature of some organic UV absorbers, the presence of a hydrophilic functional group may turn out to be insufficient to provide them with solubility in water.

Finally, the grafting of substituents may also exhibit some constraints related to the use of the UV absorbers thus modified in the formulations. Thus, the grafting of a carboxylic group requires, for example, dispersing the corresponding compound in a basic medium.

Consequently, a need remains for a technology which makes it possible to increase the aqueous solubility of conventional organic UV absorbers without, furthermore, affecting their UV-absorbing properties.

A need also remains for organic UV absorbers which exhibit an affinity for water and which are in addition compatible with a formulation in an aqueous medium at a high concentration. This is because accessibility to a high concentration is desired in view of the fact that some organic UV absorbers have to be used in fairly high amounts per unit of surface area in order to be effective.

The present invention is targeted specifically at meeting these needs.

Thus, according to one of its aspects, a subject matter of the present invention is nanoparticles having a core formed in all or part of at least one UV-absorbing organic compound, in crystalline form, coated with an outer layer formed of at least one hydrophilic polymer, said UV-absorbing organic compound(s) and hydrophilic polymer(s) being combined in an organic compound(s)/hydrophilic polymer(s) ratio by weight varying from 0.2 to 0.4.

Advantageously, the nanoparticles under consideration according to the invention are water-dispersible.

According to a specific embodiment, the hydrophilic polymers under consideration according to the invention advantageously have a molecular weight of greater than 9000 g/mol. Advantageously, the outer layer of the nanoparticles is noncrosslinked.

Generally, the nanoparticles according to the invention are nonporous.

Another subject matter of the invention is a composition comprising such nanoparticles.

The invention is also targeted at a process for the preparation of these nanoparticles comprising at least the stages consisting in:
  having available an organic phase comprising at least one UV-absorbing compound in the solute state,
  having available an aqueous phase comprising at least one hydrophilic polymer,
  adding the organic phase to the aqueous phase under conditions propitious to the formation of an emulsion of the type consisting of an organic phase in an aqueous phase and in the presence of at least one surfactant capable of stabilizing said emulsion,
  carrying out a thermal quenching of the emulsion thus obtained in order to form said nanoparticles, and
  isolating said nanoparticles,
the amounts of polymer(s) and organic compound(s) being adjusted in order for the nanoparticles to have an organic compound(s)/hydrophilic polymer(s) ratio by weight varying from 0.2 to 0.4.

According to a preferred embodiment, the nanoparticles are isolated from the medium comprising them by lyophilization of the medium.

As demonstrated by the examples which appear below, the inventors have thus found that UV-absorbing organic compounds can be formulated in the form of nanoparticles dispersible in an aqueous medium by covering, at least in part, their outer surface with a film of polymer(s) exhibiting a high affinity for water.

Contrary to all expectations, their performances in terms of UV absorption and stability are not affected.

Nanoparticles

The UV-absorbing organic compound, forming in part or completely the core of the nanoparticles, which can be used according to the present invention can be chosen from:
  substituted benzotriazoles,
  substituted benzophenones, such as hydroxybenzophenones, pyrene and its derivatives,
other antioxidants and
radical scavengers, such as bis(2,2,6,6-tetramethyl-4-piperidyl) sebacate
the hexyl ester of 2-(4-diethylamino-2-hydroxybenzoyl) benzoic acid and their mixtures.

For its part, the hydrophilic polymer can be chosen from polymers of a highly hydrophilic nature having a molecular chain length which is sufficiently long to exhibit an affinity with the organic core.

As specified above, it makes it possible to overcome the hydrophobic nature of the organic core and to ensure the cohesion of the core of the nanoparticles.

A hydrophilic polymer suitable for the invention advantageously has a molecular weight of greater than 10 000 g/mol, in particular of greater than 20 000 g/mol and more particularly varying from 25 000 to 600 000 g/mol.

This hydrophilic polymer can, for example, be chosen from: polyvinyl alcohols, dextran, sodium alginate, polyaspartic acid, polyethylene glycol, polyethylene oxide, polyvinylpyrrolidone, polyacrylic acid and its salts, polyacrylamide, poly(N-isopropylacrylamide), poly(hydroxyethyl) acrylate, poly(sodium sytrenesulfonate), poly(2-acrylamido-2-methyl-1-propanesulfonic acid), polysaccharides, cellulose derivatives, copolymers of the abovementioned polymers and their mixtures.

More particularly, the hydrophilic polymer is a polyvinyl alcohol or a polyacrylic acid.

For their part, polyacrylic acids advantageously have a molecular weight of 10 000 to 600 000, more particularly of between 100 000 and 600 000 and in particular of the order of 450 000 g/mol.

Other polymers which are water-soluble, copolymers or derivatives of such materials will be apparent to a person skilled in the art.

More particularly, the polymer is a polyvinyl alcohol.

As specified above, the polymer under consideration according to the invention is dedicated to providing for the dispersion in an aqueous medium of the UV-absorbing compound with which it is combined. For obvious reasons, its chemical nature, and also the length of its polymer chain and thus its molecular weight, are parameters which make it possible to adjust this solubility in an aqueous medium.

The inventors have in particular found that polymers, such as polyvinyl alcohols, prove to be particularly effective when they have a molecular weight of greater than 10 000 g/mol, in particular of greater than 20 000 g/mol and more particularly varying from 25 000 to 500 000 g/mol.

According to an advantageous alternative embodiment, the nanoparticles have an outer layer formed in all or part of at least one polyvinyl alcohol with a molecular weight varying from 25 000 to 100 000 g/mol and more particularly from 25 000 to 50 000 g/mol.

Said UV-absorbing organic compound(s) and hydrophilic polymer(s) are combined in an organic compound(s)/hydrophilic polymer(s) ratio by weight varying from 0.2 to 0.4, in particular of the order of 0.3.

This ratio can also be assessed as showing the degree of charge corresponding to the weight of the material forming the core of a nanoparticle with respect to the total weight of said nanoparticle.

The nanoparticles according to the invention can advantageously have a mean size of less than 500 nm, preferably of less than 300 nm, more preferably of less than 200 nm.

This size can be determined by photon correlation spectroscopy.

According to a specific embodiment of the invention, the nanoparticles can have a greatly reduced size, in particular varying from 20 to 100 nm, in particular from 25 to 60 nm. This smaller size can be adjusted by bringing the nanoparticles obtained according to the process described below into contact with a poor solvent for the polymer forming the outer layer of these nanoparticles.

According to another alternative embodiment, the nanoparticles can comprise, in their core, in addition to at least one UV-absorbing organic compound, a supplementary material.

This supplementary material can be any compound, with regard to which it is or is not desired to overcome a lack of aqueous solubility. Furthermore, this compound is chosen with a view to its nonreactivity with regard to the UV absorber considered in parallel.

Mention may in particular be made, as supplementary material, of:
a) inorganic UV screening agents, such as $TiO_2$, ZnO or $CeO_2$,
b) additives, such as antioxidants or free-radical deactivators,
c) stabilizers,
d) organic or inorganic coloring agents, and
e) optical brighteners.

Process

The present invention is targeted in addition at a process of use in the preparation of nanoparticles as described above.

Organic Phase

The process according to the invention involves, first, having available an organic phase in which the anti-UV absorber is essentially, that is to say in a proportion of at least 90% by weight, in the solute state.

The choice of the organic solvent or mixture of organic solvents is thus advantageously made with a view to the nature of the UV-absorbing compound to be treated according to the invention. Furthermore, it is also chosen with a view to its lack of solubility in an aqueous medium in order specifically to obtain a corresponding emulsion when it is brought into contact with the aqueous phase.

This choice clearly comes within the competence of a person skilled in the art.

The solvent may or may not be volatile and is preferably chosen from 2-hexanone, 3-hexanone, 4-methyl-2-pentanone, 3-methyl-2-butanone, cyclohexanone, cyclohexane, isobutyraldehyde, butyraldehyde, isovaleraldehyde, 2-methylbutyraldehyde, trimethylacetaldehyde, 2-ethylbutyraldehyde, benzene, xylenes and mesitylene, and methyl ethyl ketone.

Very particularly suitable according to the invention are the solvents characterized by a high melting point and among them aldehydes.

According to a preferred alternative form, the organic solvent is chosen from methyl ethyl ketone, cyclohexane and isobutyraldehyde.

The organic phase can comprise from 5% to 20% by weight, with respect to its total weight, of anti-UV absorber(s).

Aqueous Phase

The process according to the invention also involves having available, secondly, an aqueous phase.

This aqueous phase comprises at least one hydrophilic polymer, in particular as defined above.

The aqueous phase can comprise water and/or at least one water-soluble solvent.

The term "water-soluble solvent" denotes, in the present invention, a compound which is liquid at ambient temperature and which is miscible with water (miscibility in water of greater than 50% by weight at 25° C. and atmospheric pressure).

The water-soluble solvents which can be used in the compositions according to the invention may or may not be volatile.

Mention may in particular be made, among water-soluble solvents which can be used in the compositions in accordance with the invention, of lower monoalcohols having from 1 to 5 carbon atoms, such as ethanol and isopropanol, glycols having from 2 to 8 carbon atoms, such as ethylene glycol, propylene glycol, 1,3-butylene glycol and dipropylene glycol, $C_3$-$C_4$ ketones and $C_2$-$C_4$ aldehydes.

The hydrophilic polymer can be formulated at a concentration varying from 2 to 10% by weight, indeed even from 3 to 8% by weight, with respect to the weight of the organic phase under consideration.

As emerges from the above, the polymer or blend of polymers and the UV-absorbing agent(s) are brought together in amounts of polymer(s) and organic compound(s) adjusted in order for the nanoparticles to have an organic compound(s)/hydrophilic polymer(s) ratio by weight varying from 0.2 to 0.4.

Of course, a person skilled in the art is in a position to carry out the necessary adjustments to the concentrations of hydrophilic polymers and of organic compounds in order to obtain nanoparticles having an organic compound(s)/hydrophilic polymer(s) ratio by weight varying from 0.2 to 0.4.

Surfactant

The mixing of the two phases is carried out in the presence of a surfactant.

According to a preferred alternative form of the invention, this surfactant appears initially in the aqueous phase.

The surfactants suitable for the invention can be chosen from all the categories of surfactants (anionic, cationic, nonionic or amphoteric). More specifically, they can be chosen from the surfactants conventionally employed in processes for the emulsification of the organic phase under consideration. Thus it is that, in order to obtain emulsions of the type consisting of an organic phase in water, the choice is made of surface-active agents having a Hydrophilic/Lipophilic Balance (HLB) of greater than 14. The term "HLB" denotes the ratio of the hydrophilicity of the polar groups of the surfactant molecules to the hydrophobicity of the lipophilic part of these same molecules; it is a term commonly used in the field of surfactants (see the treatise "Techniques de l'Ingénieur" [Techniques for the Engineer], Chapter A7610: "Surfactants").

The surface-active agents which can be used according to the invention are advantageously nonamphoteric and can be chosen more particularly from anionic surface-active agents, the hydrophilic part of which is negatively charged, such as fatty acid salts, nonionic surface-active agents, the hydrophilic part of which is not charged, such as alcohols, and cationic surface-active agents, the hydrophilic part of which is positively charged, such as a long-chain ammonium salt.

Advantageously, care will be taken to dissolve the surface-active agent(s) beforehand in the aqueous phase in order to avoid possible problems of dissolution kinetics. The surface-active agents are employed in the process according to the invention at a reduced amount and preferably at an amount varying between 0.1% and 10% by weight, expressed with respect to the weight of the aqueous phase.

The surfactant is, for example, chosen from cetyltrimethylammonium bromide, sodium dodecyl sulfate and Pluronic® surfactants.

According to a preferred form of the invention, the surfactant used is sodium dodecyl sulfate (SDS).

The emulsion is formed by slowly adding, generally dropwise and with vigorous stirring, the organic phase to the aqueous phase.

This stirring, which is generally mechanical, is prolonged by a period of time sufficient to obtain the expected emulsion.

This emulsion can also be obtained by mixing the components in a single-jet continuous reactor, the speed of the booster pump imposing turbulent conditions which thus ensure the quality of the mixing. The advantage of this approach lies in the fact that the emulsion thus formed can be consecutively "quenched" in liquid nitrogen continuously in order to form the expected nanoparticles. On conclusion of this stage, an emulsion is obtained formed of droplets of the organic phase dispersed in an aqueous phase.

It is within the scope of a person skilled in the art to adjust it by varying the nature of the organic solvent and the surfactant(s) selected but also by varying the stirring speed used.

The process according to the invention subsequently comprises a stage of thermal quenching of the emulsion.

This stage consists in exposing the emulsion to a very low temperature in order to solidify the droplets of the emulsion in the form of nanoparticles. This temperature can vary from 5° C. to −250° C., indeed even from −15° C. to −200° C.

The thermal quenching is preferably carried out by introducing the emulsion dropwise into liquid nitrogen.

However, it can also be carried out by spraying the emulsion over a liquefied noble gas, such as argon, freon, indeed even a solvent (alcohol, ketone)/liquid nitrogen mixture.

The process according to the invention additionally comprises a stage consisting in isolating the nanoparticles obtained in the preceding stage. They can in particular be isolated by filtering the liquid medium in which they are present.

These nanoparticles are advantageously subjected to lyophilization. This lyophilization can be carried out very soon after the preceding stage. It is targeted at removing the water and the residual organic solvents remaining in the nanoparticles.

Applications

The nanoparticles under consideration according to the invention can be employed in a great diversity of materials which have to be protected from UV irradiation.

Thus, in the field of polymer materials, they can in particular be elastomers, adhesives, paints or other types of coatings.

More specifically, the polymers or other substrates in which the nanoparticles under consideration according to the invention can be incorporated are, for example:

polymers of monoolefins and diolefins, for example polypropylene and polyisobutylene, and also polymers of cycloolefins, for example cyclopentene and norbornene, copolymers of monoolefins and diolefins, for example the copolymer of ethylene and propylene, copolymers of alkyl methacrylate and ethylene, copolymers of vinyl acetate and ethylene, copolymers of acrylic acid and ethylene, their blends and also their blends with other polymers, such as polyamides, hydrocarbon resins, polystyrenes, styrene copolymers, halogen-comprising polymers, polymers derived from α,β-unsaturated acids and their derivatives, such as polyacrylates and polymethacrylates, polyacrylamides and polyacrylonitriles, copolymers of abovementioned monomers, polymers derived from unsaturated alcohols and from amides of acyl or acetal derivatives, such as, for example, polyvinyl alcohol, homopolymers and copolymers of cyclic ethers, such as polyalkylene glycol, polyacetals, such as polyoxymethylene, polyamides and copolyamides derived from diamines and dicarboxylic acids, and/or from aminocarboxylic acids or corresponding lactams, polyaramids, polyureas, polyimides, polyamide-imides, polyetherimides, polyesterimides, polyhydantoins and polybenzimidazoles, polyurethanes, polyesters derived from dicarboxylic acids and diols and/or derived from hydroxycarboxylic acids or corresponding lactones, polycarbonates and polyester-carbonates, and natural polymers, such as cellulose, rubber, gelatin, silk, leather and their chemically modified homologous derivatives, such as cellulose acetates.

The amount of nanoparticles in accordance with the invention to be used depends on the material to be protected and on its use.

Advantageously, the nanoparticles under consideration according to the invention can be present in these materials in an amount which can range up to 30% by weight, with respect to the total weight of the material.

Generally, the nanoparticles under consideration according to the invention can be employed in a proportion of 0.01 to 25% by weight, with respect to the total weight of the material in which they are incorporated.

The invention thus relates to a composition and more particularly a material comprising nanoparticles in accordance with the invention.

The invention also relates to a process for the stabilization of a material which can be organic or inorganic with regard to UV degradation, comprising the addition, to this material or to a precursor of this material, of at least one nanoparticle in accordance with the invention as agent for absorbing ultraviolet radiation.

As emerges from that which follows, the nanoparticles under consideration according to the invention can be employed directly in the material to be treated but also in a precursor of this material, that is to say one of the starting materials necessary for the preparation of the final material, for example a monomer for the preparation of polymeric material.

The incorporation in organic polymers, for example synthetic organic polymers and in particular thermoplastic polymers, can be carried out by addition of the nanoparticles under consideration according to the invention and of any other additive by the methods conventional in this field.

Thus, during incorporation in a polymeric material, the nanoparticles under consideration according to the invention can be incorporated either directly in the polymer, on the one hand, or before or during the polymerization of the corresponding monomer or also before the formation of a network, on the other hand. The polymers treated according to this method can subsequently be transformed into articles, such as fibers, films, sheets, packagings, pipes and other profiled elements, by conventional methods, such as thermomolding, extrusion or injection molding.

Likewise, the use of the nanoparticles under consideration according to the invention for coatings, for example for paints, is particularly advantageous. The coatings according to the invention can be applied to any substrate, for example made of metal, wood, plastic or ceramic.

The nanoparticles under consideration according to the invention are also suitable for use in a process for the photochemical stabilization of uncolored, colored or printed fibrous materials, for example comprising silk, leather, wool, polyamides, polyesters or polyurethanes, and more particularly fibrous materials comprising cellulose, such as cotton, flax or jute, and also viscose fibers and regenerated cellulose.

The invention also relates to a process for increasing the sun protection factor of textile fibers, comprising the immobilization, on said fibers, of at least one nanoparticle in accordance with the invention.

This immobilization or else fixing can, for example, be carried out according to the "padding" technique. This technique consists in producing an aqueous solution comprising the nanoparticles, optionally dispersing agents, an adjusted pH and binders. The textile to be treated is dipped therein for impregnation and then wrung dry.

Another technique suitable for the fixing is that of coating, which consists in coating the textile to be treated with a viscose aqueous solution comprising the nanoparticles, a binder, optionally dispersing agents, an adjusted pH and thickening agents.

The implementation of these two techniques also comes within the competence of a person skilled in the art.

The textile material to be protected is preferably a dyed textile material, in particular a textile material dyed with dyes dispersed in an aqueous solution. These dyes can be present in the dyeing solution in the form of a suspension. They can belong to various categories of dyes, such as coumarins or nitro dyes. Mixtures of dyes can also be used according to the present invention. If the nanoparticles under consideration according to the invention are added during the dyeing stage, they can be added so that the textile material is first treated with said nanoparticles and then subsequently with the dye or, preferably, so that the material is treated simultaneously with said nanoparticles and the dye.

For the production of inks, the nanoparticles under consideration according to the invention can be mixed with the ink pastes.

The nanoparticles under consideration according to the invention are also suitable as photoprotective agents in cosmetic preparations.

The examples and figures which follow are presented by way of illustration and without implied limitation of the field of the invention.

FIG. 1: Representation of the absorption spectrum of HMPB2 nanoparticles in accordance with the invention, having an outer layer formed by a polyvinyl alcohol.

Figure 2:
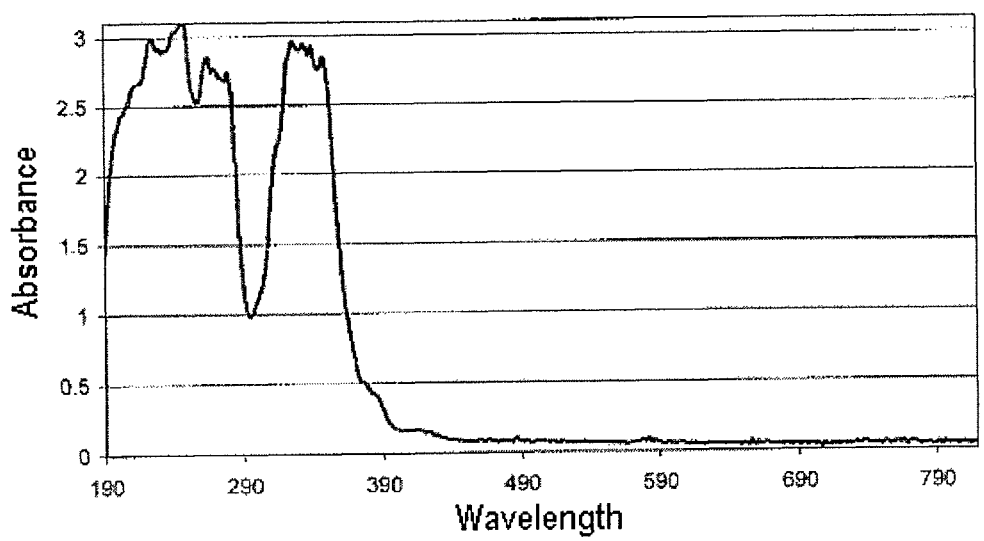

FIG. 2: Representation of the absorption spectrum of pyrene-1-carboxylic acid nanoparticles in accordance with the invention, having an outer layer formed by a polyvinyl alcohol.

Figure 3:
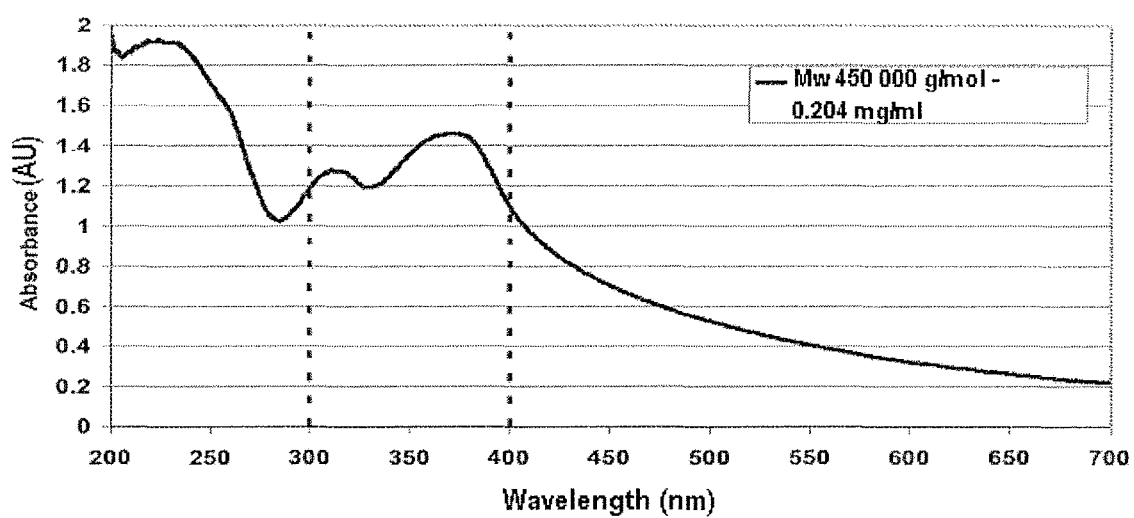

FIG. 3: Representation of the absorption spectrum of HMPB2 nanoparticles in accordance with the invention, having an outer layer formed by a polyacrylic acid.

EXAMPLE 1

A solution S1 is prepared from 6 ml of a 5% by mass aqueous polyvinyl alcohol (Mw 31 000-50 000) (Mowiol®) solution and 0.3 g of sodium dodecyl sulfate.

A solution S2 of 2-(2H-benzotriazol-2-yl)-4,6-bis(1-methyl-1-phenyl-ethyl)phenol (HMPB2) is prepared by dissolving 0.26 g of HMPB2 in 22 ml of cyclohexane with stirring.

The solution S2 is added, dropwise and at ambient temperature, to the solution S1 with vigorous stirring in a beaker or a separating funnel. Stirring is maintained for 2 hours in order for the emulsion to homogenize.

The emulsion S3 is subsequently introduced dropwise into liquid nitrogen in order to solidify the droplets in the form of nanoparticles. The combined product is subsequently filtered and lyophilized using a freeze dryer or using a Schlenk line maintained under dynamic vacuum by a vane pump and equipped with a cold trap for 24 hours.

The powder thus obtained is easily redispersed in water and, as illustrated in FIG. 1, exhibits the absorption spectrum characteristic of the starting HMPB2.

EXAMPLE 2

Nanoparticles are prepared according to the procedure described in example 1 but using, as solution S2, a solution S2' prepared by dissolving 0.46 g of pyrene-1-carboxylic acid in 70 ml of methyl ethyl ketone with stirring and moderate heating, that is to say at a temperature of less than 30° C., indeed even at ambient temperature.

The powder thus obtained is easily redispersed in water and, as illustrated in FIG. 2, exhibits an absorption spectrum characteristic of the starting molecule.

A sample of fabric (SAM1) is impregnated according to the padding technique with a concentrated aqueous solution of pyrene-1-carboxylic acid comprising 6.82 mg/ml of active molecule obtained according to the process described above.

The sample (SAM1) obtained is white (color of the fabric) and is subjected to an aging test in a Suntest chamber from Atlas. The aging conditions are as follows: irradiance at 620 W/m$^2$, xenon arc lamp equipped with a "sheet glass" filter which cuts off the UV radiation below 310 nm, exposure time 24 h.

On conclusion of this aging test, SAM1 has very slightly yellowed, showing the ability of the nanoparticles according to the invention to protect the exposed fabric.

The treatment of the present invention clearly makes it possible to improve the resistance to light of sensitive molecules.

EXAMPLE 3

Nanoparticles are prepared according to the procedure described in example 1 but using, as solution S2, a solution S2'' prepared by dissolving 0.4515 g of HMPB2 in 18 ml of isobutyraldehyde with stirring and moderate heating, that is to say at a temperature of less than 30° C., indeed even at ambient temperature.

The powder thus obtained is easily redispersed in water and exhibits an absorption spectrum characteristic of the starting HMPB2.

EXAMPLE 4

A solution S1 is prepared from 6 ml of a 5% by mass aqueous solution of polyacrylic acid of molecular weight Mw=450 000 g/mol (sold by Aldrich under No. 181285) and 0.3 g of sodium dodecyl sulfate.

A solution S2 of 2-(2H-benzotriazol-2-yl)-4,6-bis(1-methyl-1-phenyl-ethyl)phenol (HMPB2) is prepared by dissolving 0.26 g of HMPB2 in 22 ml of cyclohexane with stirring.

The solution S2 is added, dropwise and at ambient temperature, to the solution S1 with vigorous stirring in a beaker or a separating funnel. Stirring is maintained for 2 hours in order for the emulsion to homogenize.

The emulsion S3 is subsequently introduced dropwise into liquid nitrogen in order to solidify the droplets in the form of nanoparticles. The combined product is subsequently filtered and lyophilized using a freeze dryer or using a Schlenk line maintained under dynamic vacuum by a vane pump and equipped with a cold trap for 24 hours.

The powder thus obtained is easily redispersed in water and, as illustrated in FIG. 3, exhibits the absorption spectrum characteristic of the starting HMPB2.

EXAMPLE 5

Nanoparticles are prepared according to the procedure described in example 1 but using, as solution S1, a solution S1' prepared from 6 ml of an aqueous solution of polyvinyl alcohol (Mw 9000-10 000) (sold by Aldrich under No. 360627).

The powder obtained according to example 1 is dispersed in water.

The value of the solubility limit is estimated by successive approximation, the powder gradually being added to water.

Stirring is halted when insoluble materials visible to the naked eye remain.

According to the same protocol, the solubility limit is evaluated for the powder formed of nanoparticles which are obtained according to example 1.

The results are presented in the following table 1.

TABLE 1

| Molecular weight of the polyvinyl alcohol (g/mol) | Solubility limit (mg/ml) |
|---|---|
| 31 000-50 000 | 10.1 |
| 9000-10 000 | 0.45 |

These results show that nanoparticles in accordance with the invention prepared from a hydrophilic polymer exhibiting a higher molecular weight exhibit an increased dispersibility in water.

The invention claimed is:

1. A nanoparticle comprising a core consisting of one or more UV-absorbing organic compound(s), in crystalline form, the core is coated with an outer layer formed of one or more hydrophilic polymer(s), said UV-absorbing organic compound(s) and hydrophilic polymer(s) being combined in an organic compound(s)/hydrophilic polymer(s) ratio by weight varying from 0.2 to 0.4, wherein said hydrophilic polymer(s) comprises at least one of a polyvinyl alcohol having a molecular weight ranging from 25,000 to 100,000 g/mole, a polyacrylic acid having a molecular weight ranging from 100,000 to 600,000 g/mole, or a combination thereof.

2. The nanoparticle of claim 1, wherein the nanoparticle is water-dispersible.

3. The nanoparticle of claim 1, wherein the outer layer comprises at least one polyvinyl alcohol with a molecular weight varying from 25,000 to 50,000 g/mol.

4. The nanoparticle of claim 1, having a mean size of less than 500 nm.

5. The nanoparticle of claim 1, having a mean size of less than 300 nm.

6. The nanoparticle of claim 1, wherein said UV-absorbing compound is chosen from substituted benzotriazoles, hydroxybenzophenones, and pyrene and its derivatives.

7. The nanoparticle of claim 1, wherein the nanoparticle is comprised within a composition.

8. The nanoparticle of claim 7, wherein the composition includes a polymeric material.

9. The nanoparticle of claim 7, wherein the composition includes a textile.

10. A process for making a nanoparticle of claim 1, comprising:
   obtaining an organic phase comprising at least one UV-absorbing organic compound in the solute state;
   obtaining an aqueous phase comprising at least one hydrophilic polymer, wherein said hydrophilic polymer is a polyvinyl alcohol having a molecular weight ranging from 25,000 to 100,000 g/mole or a polyacrylic acid having a molecular weight ranging from 100,000 to 600,000 g/mole;
   adding the organic phase to the aqueous phase under conditions propitious to the formation of an emulsion, wherein the organic phase is dispersed in the aqueous phase, and wherein the emulsion includes at least one surfactant capable of stabilizing the emulsion;
   carrying out a thermal quenching of the emulsion thus obtained in order to form said nanoparticles; and
   isolating said nanoparticles,
wherein the amounts of polymer(s) and organic compound(s) are adjusted in order for the nanoparticle to have an organic compound(s)/hydrophilic polymer(s) ratio by weight varying from 0.2 to 0.4.

11. The process of claim 10, wherein the isolated nanoparticles are lyophilized.

12. The process of claims 10, wherein the organic phase comprises, as solvent, cyclohexane, methyl ethyl ketone or isobutyraldehyde.

13. The process of claim 10, wherein the thermal quenching is carried out by bringing the emulsion into contact with liquid nitrogen.

14. A process for stabilizing a material with regard to UV degradation, comprising adding to the material or to a precursor of the material, at least one nanoparticle of claim 1 as an agent for absorbing ultraviolet light radiation, wherein addition of the nanoparticle to the material or precursor of the material stabilizes the material or precursor with regard to UV degradation.

15. A process for increasing the sun protection factor of a textile fiber, comprising immobilizing on the fiber at least one nanoparticle of claim 1, wherein immobilization of the nanopartile on the fiber increases the sun protection factor of the fiber.

* * * * *